United States Patent [19]

Clark et al.

[11] Patent Number: 5,483,813
[45] Date of Patent: Jan. 16, 1996

[54] PROCESS TO MAKE A TOROID OUTER SHELL FROM SHEET STOCK

[75] Inventors: Randall J. Clark, Pleasant View; George C. Marjanski, Riverdale, both of Utah; Leland B. Kort, Lakewood, Colo.

[73] Assignee: Morton International, Inc., Chicago, Ill.

[21] Appl. No.: 195,403

[22] Filed: Feb. 14, 1994

[51] Int. Cl.⁶ .......................... B21D 51/24; B21D 53/88
[52] U.S. Cl. ................... 72/334; 72/338; 72/348; 72/379.4; 72/377; 280/736
[58] Field of Search ...................... 72/379.2, 334, 72/377, 348, 339, 338, 379.4; 29/890.14; 280/741, 737, 736

[56] References Cited

U.S. PATENT DOCUMENTS

| | | | |
|---|---|---|---|
| 172,720 | 1/1876 | Ecaubert | 72/327 |
| 2,355,792 | 8/1944 | Franck | 72/339 |
| 3,901,530 | 8/1975 | Radke | 280/150 AB |
| 4,131,300 | 12/1978 | Radke | 280/737 |
| 5,199,740 | 4/1993 | Frantom | 280/736 |

FOREIGN PATENT DOCUMENTS

| | | | |
|---|---|---|---|
| 261467 | 10/1993 | Japan | 72/334 |
| 568491 | 8/1977 | U.S.S.R. | 72/334 |
| 6094 | of 1913 | United Kingdom | 72/348 |

*Primary Examiner*—Daniel C. Crane
*Attorney, Agent, or Firm*—Lawrence I. Field; Gerald K. White

[57] ABSTRACT

A process for converting sheet stock into a seamless outer shell for a toroidal shaped hybrid inflator for air bag inflation systems. In the process a seamless toroidal shaped shell is fabricated from sheet stock by a sequence of process steps comprising first drawing the sheet into a cup shaped blank, with curved transitions between the bottom wall and the sidewall, and then shaping the open end of the cup to the desired toroidal shape while simultaneously thickening the areas adjacent to the perimeter of the open end of the cup and finally removing the central portion of the bottom of the cup—thereby producing the desired shell.

6 Claims, 1 Drawing Sheet

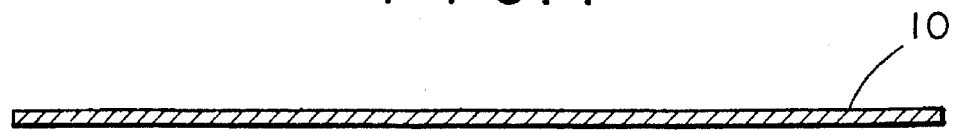
FIG. I
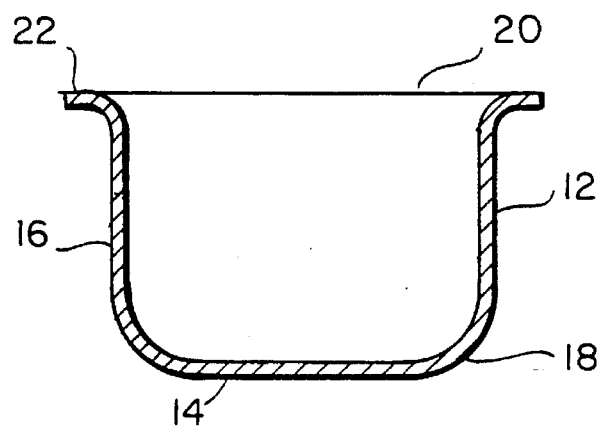
FIG. 2
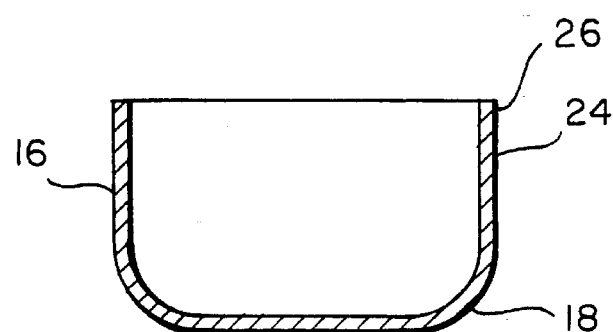
FIG. 3
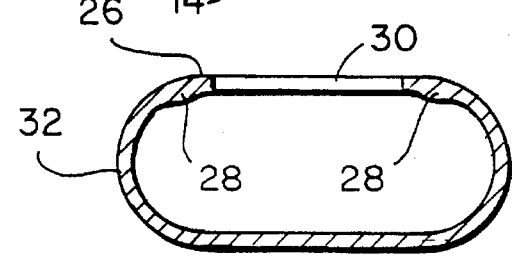
FIG. 4
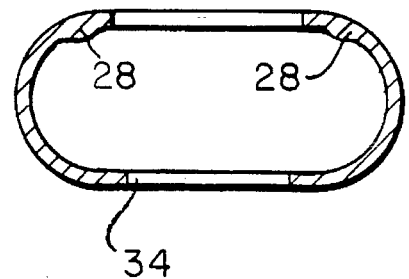
FIG. 5

PROCESS TO MAKE A TOROID OUTER SHELL FROM SHEET STOCK

This invention relates to a process for making a toroid shell from sheet stock. More particularly it relates to a process for converting sheet stock into a shape suitable as an outer shell or container or pressure vessel useful in hybrid inflators for airbag systems.

Inflatable airbags are presently being featured as standard or optional equipment on automobiles. The airbags may be inflated by the gases generated from chemical compositions or by gas stored within a pressurized container, or by a combination of inflation from both sources of gas. The latter is termed a hybrid inflator in this art.

Because in hybrid inflation devices a gas is stored under high pressure it is essential that the storage vessel be as free from discontinuities as possible and hence seams or other discontinuities are to be avoided. Since most tubes are manufactured by processes which result in a seam in the tube, it has been necessary to devise a process in which a seamless blank is shaped into a seamless shell in which the gas may be safely stored at high pressures.

A principal object of this invention is to provide a simple, relatively inexpensive process whereby a sheet of stock material may be shaped into a configuration suitable for the outer shell of a hybrid airbag inflation device of the type shown in U.S. Pat. No. 5,199,740 issued Apr. 6, 1993; Radke U.S. Pat. No. 3,901,530 issued Aug. 26, 1975 and Radke U.S. Pat. No. 4,131,300 issued Dec. 26, 1978, the disclosures of which are incorporated in this reference.

The shell of a hybrid airbag inflation device must contain a stored gas under high pressure, as described in the above noted patents, often for a period of years once it has been installed in a motor vehicle. Therefore it must be resistant to corrosion, and be free of defects which might cause failure. A seamless toroidal shape is particularly well suited to the intended use and is ordinarily assembled with the other components of the inflation device by welding.

The present invention resides in a method of fabricating a seamless toroidal shell for an air bag inflator housing from flat sheet stock, the shell being thickened at one end of the toroid or at both ends of the toroid.

The invention will become apparent from the description which follows taken in conjunction with the drawings in which:

FIGS. 1–5 show a sequence of shapes produced in the practice of the process of the present invention.

As shown in FIG. 1, the material to be shaped is originally a flat sheet 10 of ductile material such as a low carbon steel, which may be either a plain carbon steel or an alloy steel such as a stainless steel. The thickness of the sheet 10 will vary with the grade of steel selected. A sheet about 0.075 inches thick of a plain carbon steel has been satisfactorily formed by the present process. Obviously other materials possessing sufficient strength to store inflation gases such as argon at several thousand pounds per square inch pressure may be processed instead of steel.

After being cut to the proper diameter, sheet 10 is drawn in the first stage in a progressive die to produce the clip shaped blank 12 shown in FIG. 2. The shape shown in FIG. 2 may be obtained in a single draw or by a series of drawing steps in which the blank 10 is progressively drawn to the shape shown in FIG. 2. Blank 12 has a substantially uniform thickness throughout the blank. The blank 12 has a bottom face 14 connected to the sidewall 16 by a curved section 18 which define the bottom half of the final product. At the open end 20 of the cup shaped blank 12 is an undrawn rim 22.

Rim 22 is removed from the cup by pinching or by cutting, leaving the cup shaped intermediate blank 24 shown in FIG. 3 with sidewall 16 which terminates in end 26.

Blank 24 is next processed in a die having a conical plug e.g. a die similar to that shown in Franck U.S. Pat. No. 2,355,792 by which the end 26 of the sidewall 16 is pressed inwardly and is thickened adjacent to the end 26 to produce the shape shown in FIG. 4 characterized by an open top 30 and curved sidewalls 32, which are preferably hemispherical in shape, but which may be flatter, if desired, and a thickened region 28 adjacent end 26. The thickening of the end of sidewall 16 may also be accomplished by working the end 26 while the blank is cup shaped (FIG. 3) before it is converted to the shape of FIG. 4.

The transition from the blank shown in FIG. 4 to the shell shown in FIG. 5 is accomplished by removing a large portion of the bottom 14, by punching, cutting or any other suitable technique to form a bottom opening 34.

If desired a similar thickening of the bottom may be produced so that both the top opening and bottom opening have thickened regions which enhance the welding of the shell to other portions of the inflator housing.

It will be seen that the toroid shaped pressure vessel has been fabricated from thin sheet stock material to create a seamless pressure vessel by the following sequence of steps: First the sheet is cut to a specific width (possibly fed from a roll of sheet stock). The sheet is then cut to a predetermined diameter (see FIG. 1). Then the sheet is placed in a die and drawn to make a cup shaped blank having the bottom half of the desired toroid shape. Excess material is then trimmed from the top of the blank. Then the blank is shaped to form the top half of the toroid with thickened areas adjacent to the rim of the top half. Finally, a hole is cut in the bottom side of the shell and if necessary the top hole is also trimmed. Inherent to the process is a strengthening mechanism due to the cold working of the part that increases the strength (tensile and compressive) of the material. The increase in strength depends upon the material formed and the severity of the several shaping steps.

The process can also be practiced to produce an oval shaped toroidal vessel rather than a circular shaped vessel, merely by changing the shape of the blank 10 and the shape of the dies.

Of course, the change in shape from FIG. 1 to FIG. 2 may be carried out in two or more steps and the same is true of the shaping step whereby the shape shown in FIG. 4 is produced from the shape shown in FIG. 3.

In one specific example a shell 4 inches in diameter and 1.8 inches high having a top opening 1.95 inches in diameter and a bottom opening 1.50 inches in diameter was formed from a plain carbon steel sheet 0.075 inches thick by the process described above and then fabricated into a hybrid inflator for air bags.

Having now described a preferred embodiment of the process it is not intended that it be limited except as may be required by the appended claims:

We claim:

1. A process for producing a seamless toroid outer shell for an air bag inflation system from flat sheet stock material, which comprises:

cutting flat sheet material to a suitable length and width, placing the cut flat sheet material in a progressive die, drawing the sheet material in the progressive die into a cup shaped blank having a shape corresponding to the bottom half of the toroid at the bottom of the cup shaped blank and an upstanding sidewall extending from said bottom half to the open end of the cup shaped blank, trimming excess material from around the perimeter of the open end of the cup shaped blank at the top of the sidewall, pressing the top of the sidewall adjacent to the perimeter by means which thicken the portion of said sidewall adjacent to said perimeter while it is being pressed to form the top half of the toroid, and then forming a hole in the bottom of the blank thereby forming the toroid outer shell.

2. The process of claim 1 wherein the sheet is a plain carbon steel sheet.

3. The process of claim 1 wherein the sheet is a stainless steel sheet.

4. The process of claim 1 wherein the toroid is circular.

5. The process of claim 1 wherein the toroid is oval.

6. The process of claim 1 including thickening the area adjacent to the perimeter of the opening in the bottom of the shaped blank.

* * * * *